United States Patent
Murveit et al.

(10) Patent No.: US 6,570,964 B1
(45) Date of Patent: *May 27, 2003

(54) TECHNIQUE FOR RECOGNIZING TELEPHONE NUMBERS AND OTHER SPOKEN INFORMATION EMBEDDED IN VOICE MESSAGES STORED IN A VOICE MESSAGING SYSTEM

(75) Inventors: Hy Murveit, Portola Valley, CA (US); Dan Enthoven, Atherton, CA (US)

(73) Assignee: Nuance Communications, Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,660

(22) Filed: Apr. 16, 1999

(51) Int. Cl.⁷ ............................................. H04M 1/64
(52) U.S. Cl. .................... 379/67.1; 379/68; 379/71; 379/76; 379/88.07; 379/88.12; 379/88.27
(58) Field of Search .................. 379/67.1, 68, 69, 379/70, 71, 72, 76, 80, 85, 88.01, 88.02, 88.03, 88.07, 88.11, 88.12, 88.19, 88.2, 88.21, 88.27

(56) References Cited

U.S. PATENT DOCUMENTS

| | | | |
|---|---|---|---|
| 4,590,604 A | | 5/1986 | Feilchenfeld ................ 381/42 |
| 5,127,055 A | | 6/1992 | Larkey ........................ 381/43 |
| 5,418,717 A | | 5/1995 | Su et al. ..................... 704/9 |
| 5,528,731 A | | 6/1996 | Sachs et al. ................ 395/2.55 |
| 5,568,540 A | * | 10/1996 | Greco et al. ............... 379/88.25 |
| 5,617,486 A | | 4/1997 | Chow et al. ................ 382/181 |
| 5,651,054 A | * | 7/1997 | Dunn et al. ................ 379/67.1 |
| 5,717,743 A | | 2/1998 | McMahan et al. .......... 379/188 |
| 5,742,905 A | * | 4/1998 | Pepe et al. ................. 455/461 |
| 5,794,192 A | | 8/1998 | Zhao .......................... 704/244 |
| 5,822,405 A | * | 10/1998 | Astarabadi ................... 379/88 |
| 5,842,161 A | | 11/1998 | Cohrs et al. ................ 704/251 |
| 5,848,130 A | * | 12/1998 | Rochkind .................... 379/67.1 |
| 5,937,384 A | | 8/1999 | Huang et al. ............... 704/256 |
| 6,044,347 A | | 3/2000 | Abella et al. ............... 704/272 |
| 6,058,363 A | | 5/2000 | Ramalingam ............... 704/251 |
| 6,272,455 B1 | | 8/2001 | Hoshen et al. .............. 704/1 |
| 6,275,801 B1 | | 8/2001 | Novak et al. ............... 704/252 |
| 6,327,343 B1 | * | 12/2001 | Epstein et al. ............. 379/88.01 |

FOREIGN PATENT DOCUMENTS

JP          10079785          3/1998          ............ H04M/1/57

* cited by examiner

*Primary Examiner*—Allan Hoosain
(74) *Attorney, Agent, or Firm*—Haverstock & Owens LLP

(57) ABSTRACT

A technique for recognizing telephone numbers and other information embedded in voice messages stored in a telephone voice messaging system. A voice recognition system is coupled to the telephone voice messaging system. A voice message stored in the voice messaging system is transferred to the voice recognition system. The voice recognition system segments the voice message and then searches the segments for a predetermined speech reference model (grammar) which is expected to contain information of importance to the recipient of the message. In a preferred embodiment, the predetermined is a numeric grammar which specifies a sequence of numbers occurring in the voice message. In alternate embodiments, the grammar specifies a date, a time, an address, and so forth, and can specify more than one such type of information. The grammar can be modified or selected by the recipient of the voice message so that the voice recognition system searches for information of particular interest to the recipient. Once the predetermined grammar is identified, the voice recognition system outputs a portion of the stored voice message which includes the grammar. The output can be a display of the information contained in the grammar, such as a telephone number or an address. Alternately, the output can be an audible replay of the portion of the stored voice message which includes the grammar.

45 Claims, 4 Drawing Sheets

TECHNIQUE FOR RECOGNIZING TELEPHONE NUMBERS AND OTHER SPOKEN INFORMATION EMBEDDED IN VOICE MESSAGES STORED IN A VOICE MESSAGING SYSTEM

FIELD OF THE INVENTION

The present invention relates to the field of natural language speech recognition. More particularly, the present invention relates to the field of recognizing telephone numbers and other spoken information embedded in natural language voice messages stored in a voice messaging system.

BACKGROUND OF THE INVENTION

Natural language is written or spoken language in a form that a person would use instinctively, as when communicating with another person. Natural language recognition systems are known which permit a user to interface with a computer system using natural language. The natural language recognition system receives spoken input from the user, interprets the input, and then translates it into a form that the computer system understands.

For example, a voice recognition application program is available from Dragon Systems, Inc., which enables a user to enter text into a written document by speaking the words to be entered into a microphone attached to the user's computer system. The application interprets the spoken words and translates them into typographical characters which then appear in the written document displayed on the user's computer screen.

Natural language recognition systems are known which provide a telephonic interface between a caller and a customer service application. For example, the caller may obtain information regarding flight availability and pricing for a particular airline and may purchase tickets utilizing natural spoken language and without requiring service from an airline reservations clerk.

Telephone voice messaging systems are known which enable a caller to leave a voice message for a system subscriber who is temporarily unavailable to take the call. Often, the voice message conveys specific and important information required by the subscriber along with other information. As a first example, a voice message may contain a personal greeting from caller, the reason for the call, and a telephone number at which the caller can be reached. As a second example, a voice message may contain a personal greeting from the caller, a reminder that a meeting is to take place, an agenda for the meeting, a time of day for the meeting and a street address for the meeting. In each of these examples, the recipient is likely to immediately assimilate all of the information conveyed by the voice messages, except that, in the first example, the recipient is likely to need to write down the telephone number of the caller and, in the second example, the recipient is likely to need to write down the time of day and the street address. Transcribing this information can be inconvenient and time consuming for the recipient, especially if the recipient needs to rewind or replay the message repeatedly to accurately transcribe information from the voice message.

Therefore, what is needed is a technique for automatically identifying and interpreting or outputting telephone numbers and other information embedded in a voice messages stored in a voice messaging system.

SUMMARY OF THE INVENTION

The invention is a method and apparatus for recognizing telephone numbers and other information embedded in voice messages stored in a telephone voice messaging system. A voice recognition system in accordance with the present invention is coupled to the telephone voice messaging system. A voice message stored in the voice messaging system is transferred from the voice messaging system to the voice recognition system. Alternately, the voice message can be provided to the voice messaging system while the message is being recorded. The voice recognition system identifies potential speech utterances in the voice message and segments the voice message into a plurality of such utterances. Alternately, the voice recognition system 100 acts on the message as a whole. The voice recognition system then searches the segments or the message as a whole for a predetermined speech reference model which is expected to contain information of importance to the recipient of the message. This reference model is called a grammar. In the preferred embodiment, a predetermined grammar is a numeric grammar which specifies a sequence of numbers occurring in the voice message which correspond to a telephone number. In alternate embodiments, the grammar can specify a date, a time, an address, a person's name and so forth. According to an aspect of the present invention, the grammar can be modified or selected by the recipient of the voice message so that the voice recognition system searches for information of particular interest to the recipient.

Once the predetermined grammar is identified, the voice recognition system outputs a portion of the stored voice message which includes the grammar. The output can be a display of the information contained in the grammar, such as a telephone number or an address. Alternately, the output can be an audible replay of just the portion of the stored voice message which includes the telephone number or address.

Important information included in the stored message may be accompanied by an indicator that important information is to follow or that important information was just given. For example, the voice message may contain a telephone number. In which case, the caller is likely to have preceded the telephone number, by saying, "you can reach me at", "my phone number is", "call me at", "my extension is", or the like. Accordingly, the indicator can be one of these phrases. As another example, the voice message may contain an address which is important. In which case, the caller is likely to have preceded a street number and street name by saying, "the address is". Alternately, the speaker may have followed a street number and street name by saying "street", "road", "avenue", "lane", or the like. Accordingly, the indicator can be one of these phrases.

In accordance with the present invention, the predetermined grammar can specify an indicator of important information along with the important information. In which case, the voice recognition system searches the voice message for the indicator in conjunction with the important information. Alternately, separate grammars are specified for the indicator and the important information. In which case, the voice recognition system first searches the voice message for the predetermined indicator. Assuming a predetermined indicator is identified, the voice recognition system then searches for the important information in the vicinity of the indicator. Thus, assuming the indicator is "my phone number is", then a numeric grammar which follows the indicator is expected to include a string of numbers, such as "555-1234". As another example, assuming the indicator is "road", then a grammar which preceded the indicator is expected to include a number and a street name, such as "1380 Willow". Finally, the recognized grammars are outputted in a form that the recipient of the message can readily utilize. For example, the telephone number, "555-1234" or the address "1380 Willow" can be displayed or audibly reproduced for the user. In addition, the indicator can be combined with the important information. Thus, the entire utterance, "my phone number is 555-1234", or "1380 Willow Road" can be provided to the recipient. Use of an indicator of the important information is expected to increase the recognition accuracy of the invention.

The invention provides an advantage to users of voice mail and other audio messaging systems by recognizing telephone numbers and other information embedded in a stored voice message and providing this information in a form which is readily accessible to the user.

DETAILED DESCRIPTION OF A PREFERRED EMBODIMENT

Figure 1:
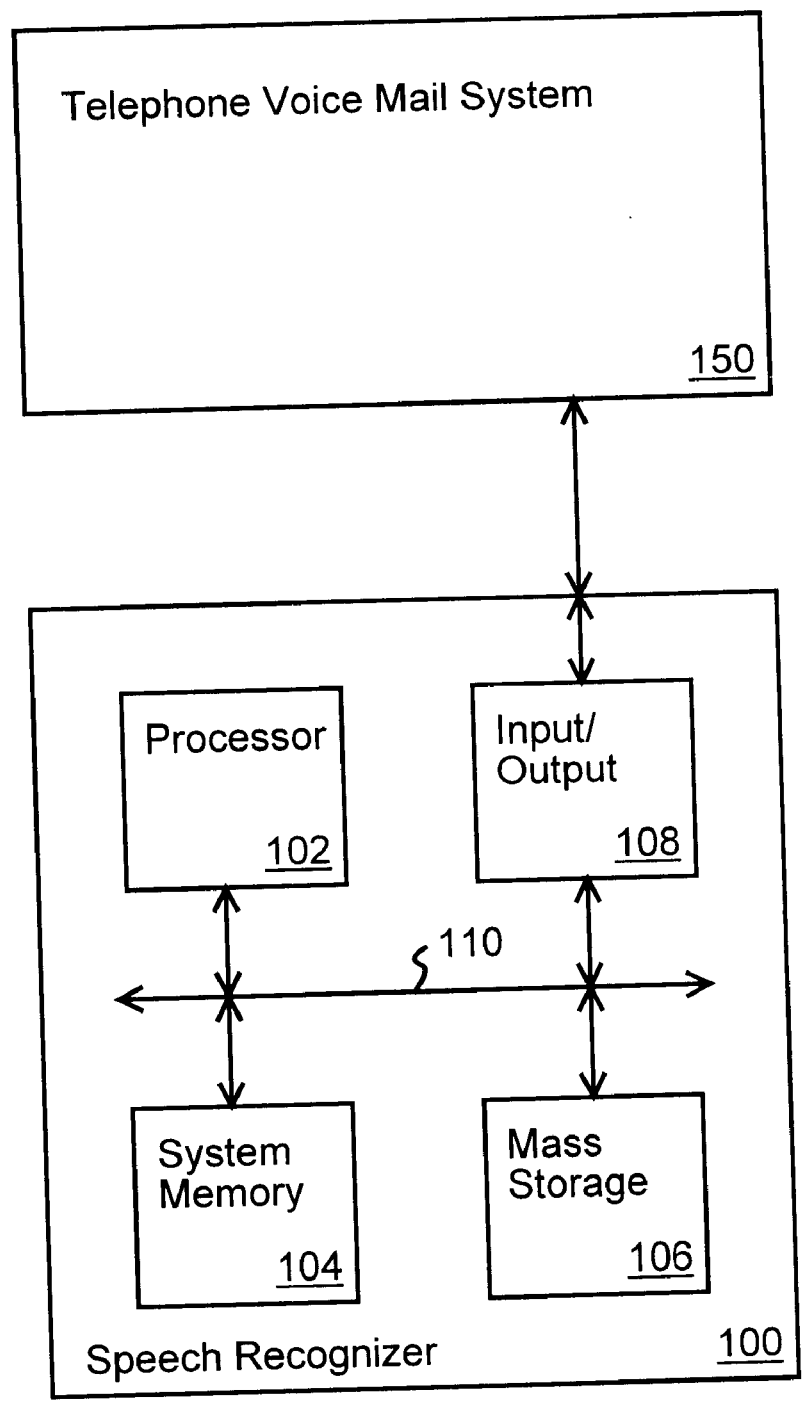
FIG. 1 illustrates a speech recognizing system in conjunction with a telephone voice mail system in accordance with the present invention.

FIG. 1 illustrates a speech recognizing system 100 in conjunction with a telephone voice mail system 150 in accordance with the present invention. The speech recognizing system 100 includes a general purpose processor 102, a system memory 104, a mass storage medium 106, and input/output devices 108, all of which are interconnected by a system bus 110. The processor 102 operates in accordance with machine readable computer software code stored in the system memory 104 and mass storage medium 106 so as to implement the present invention. The input/output devices 108 can include a display monitor, a keyboard and an interface coupled to the telephone voice mail system 150 for receiving voice messages therefrom. Though the speech recognizing system illustrated in FIG. 1 is implemented as a general purpose computer, it will be apparent that the speech recognizing system can be implemented so as to include a special-purpose computer or dedicated hardware circuits. In which case, one or more of the hardware elements illustrated in FIG. 1 can be omitted or substituted by another.

The voice mail system 150 can be coupled to telephone system (not shown), such as a central office of a telephone service provider or a private branch exchange, for receiving and recording messages from callers intended to be retrieved at a later time by a subscriber to the voice mail system 150. It will be apparent that the voice mail system 150 can alternately be incorporated into the voice recognizing system 100 and implemented by the processor 102 operating according to a stored software program. In which case, voice messages are stored in the memory 104 or mass storage 106, rather than externally to the speech recognizing system 100.

A caller leaves a voice message for an intended recipient subscriber who is temporarily unavailable to receive the call. The voice message is then stored by the voice mail system 150 as natural language speech. The message can then be audibly replayed by the intended recipient at the recipient's convenience. The stored message is expected to contain specific and important information required by the recipient along with other information. As a first example, the voice message may contain a personal greeting from caller, the reason for the call, and a telephone number at which the caller can be reached. As a second example, the voice message may contain a personal greeting from the caller, a reminder that a meeting is to take place, an agenda for the meeting, a time of day for the meeting and a street address for the meeting. In each of these examples, the recipient is likely to immediately assimilate all of the information conveyed by the voice messages upon a single playback of each message, except that, in the first example, the recipient is may not remember the entire telephone number of the caller and, in the second example, the recipient may not remember the time of day and the street address.

Conventionally, the recipient replays the message repeatedly until able to write down all of the important information or commit it to memory. In accordance with the present invention, the important information is provided to the user in a more convenient and readily accessible form. More particularly, the voice recognition system 100 of the present invention receives the voice message from the voice mail system 150 and extracts the important information from the message, such as telephone numbers or other information, required by the recipient of the message and provides this information to the recipient in a form that is convenient and readily accessible by the recipient.

Figure 2:
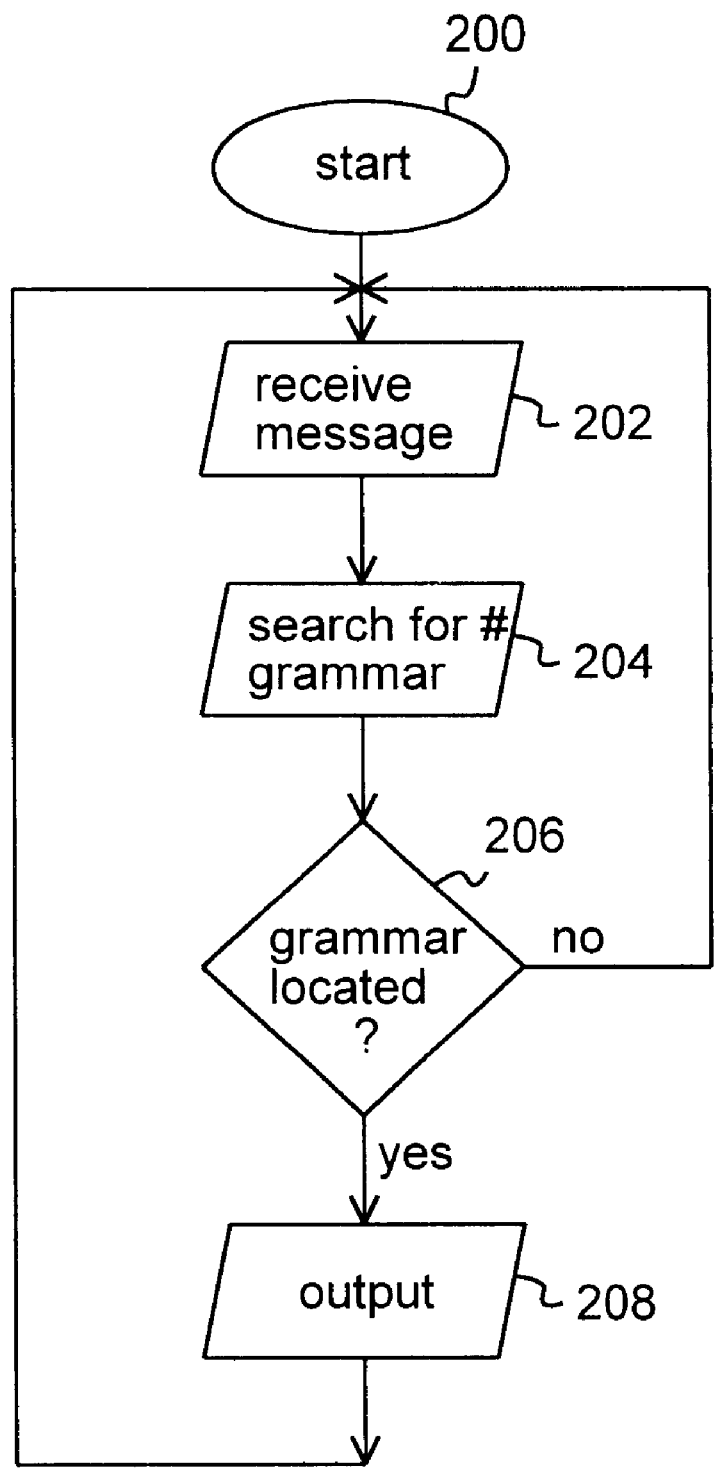
FIG. 2 illustrates flow diagram for recognizing telephone numbers and other information embedded in a voice message in accordance with the present invention.

FIG. 2 illustrates a flow diagram for recognizing telephone numbers and other information embedded in voice messages in accordance with the present invention. The flow diagram of FIG. 2 illustrates graphically operation of the speech recognizing system 100 in accordance with the present invention. Program flow begins in a start state 200. From the state 200, program flow moves to a state 202. In the state 202, the voice recognition system 100 receives a voice message from the voice messaging system 150. The voice message can be received while the voice message is being recorded, upon playback of the message by the voice messaging system 150 or upon initiation by the intended recipient of the voice message. Note that the voice recognition system 100 preferably acts upon the voice message while the recipient is listening to the voice message being played back. This allows the extracted important information to be provided to the recipient prior to playing back the message, immediately upon conclusion of the message or soon thereafter.

From the state 202, program flow moves to a state 204. In the state 204, the voice recognition system 100 identifies potential speech utterances in the stored voice message and segments the voice message into a plurality of such utterances. Alternately, the voice recognition system 100 acts on the message as a whole. The voice recognition system 100 then searches the segments or the entire message for a predetermined speech reference model which is expected to contain information of importance to the recipient of the message. This reference model is called a grammar. In the preferred embodiment, a predetermined grammar is a numeric grammar which specifies a sequence of numbers occurring in the voice message. It will be apparent that the predetermined grammar could be modified to specify a date, a time, an address, a person's name, or any other information of interest that may be contained in a stored voice message. Alternately, the predetermined grammar can be replaced with a plurality of predetermined grammars. In which case, the voice recognition system 100 can search for a plurality of information types in the state 204. For example, voice recognition system can search for a telephone number and time of day in the state 204.

In addition to specifying the information of interest, the predetermined grammars may also model superfluous speech or sounds surrounding the information bearing speech in the voice message. For instance, a telephone number grammar may specify a sequence of zero or more words of any kind, followed by a sequence of numbers, followed by a sequence of zero or more words of any kind. Alternatively, it could specify a sequence of zero or more sounds of any kind, followed by a sequence of numbers, followed by a sequence of zero or more sounds of any kind, where the sounds may be, for example, all the phonemes of the English language. When the grammar matches a portion of the voice message, the sequence of numbers matched would correspond to the information of interest (e.g., the telephone number), and the possible initial and final sequences would correspond to superfluous speech surrounding the telephone numbers in the message. In such an approach, a weighting is preferably placed in the grammar to prevent the part of the grammar modeling the superfluous speech or sounds in the voice message from matching the information bearing part of the voice message.

If the search performed in the state 204 is successful in locating the predetermined grammar (with at least a predetermined level of certainty), this results in the identification of a portion of the voice message which includes the predetermined grammar or grammars (e.g., the portion containing the telephone number is identified.)

Then program flow moves from the state 204 to a state 206. In the state 206, a determination is made as to whether the search performed in the state 204 was successful in locating a predetermined grammar. If the search was not successful, program flow is aborted for corrective action. For example, program flow returns to the state 202 to await reception of a next voice message. Alternately, the corrective action can include repeating the search.

Otherwise, if the search was successful, program flow moves from the state 206 to a state 208. In the state 208 the voice recognition system 100 outputs a portion of the stored voice message which includes the grammar. In the case where multiple predetermined grammars are identified, then multiple portions of the message can be outputted. The output can be a display of the important information contained in the grammar, such as a display of the caller's telephone number. In which case, the voice recognition system 100 interprets the information contained in the grammar in accordance with conventional voice recognition techniques and displays this information for the recipient as a series of alphanumeric characters. For example, the alphanumeric characters can appear on the monitor included in the input/output devices 108. Alternately, the output can be the information spoken by a synthesized voice. If the information is a telephone number, the output can be dual-tone, multi-frequency (DTMF) tones which are applied to an outgoing telephone line so as to initiate return of the call to the caller.

A disadvantage of interpreting the important information and then displaying it for the recipient is that it is possible for an error to be introduced during the interpretation process depending upon a variety of factors, such as environmental noise, the caller's speech habits, and so forth. For example, if the caller states that the telephone number is "555-1234", it is possible for the voice recognition system 100 to interpret this as "555-1235". In which case, an erroneous telephone number would be displayed for the recipient. Accordingly, rather than attempting to display the telephone number, the voice recognition system 100 can audibly replay the portion of the voice message which includes the grammar. For example, upon completion of replaying the entire voice message, which includes the caller's telephone number along with other information, the user would then again hear just the portion of the telephone message which includes the telephone number.

As an alternative, the voice recognition system 100 plays back the important information to the person who is leaving the message. In which case, the person leaving the message can be prompted to verify the accuracy of the identification of such information performed by the voice recognition system 100.

Figure 3:
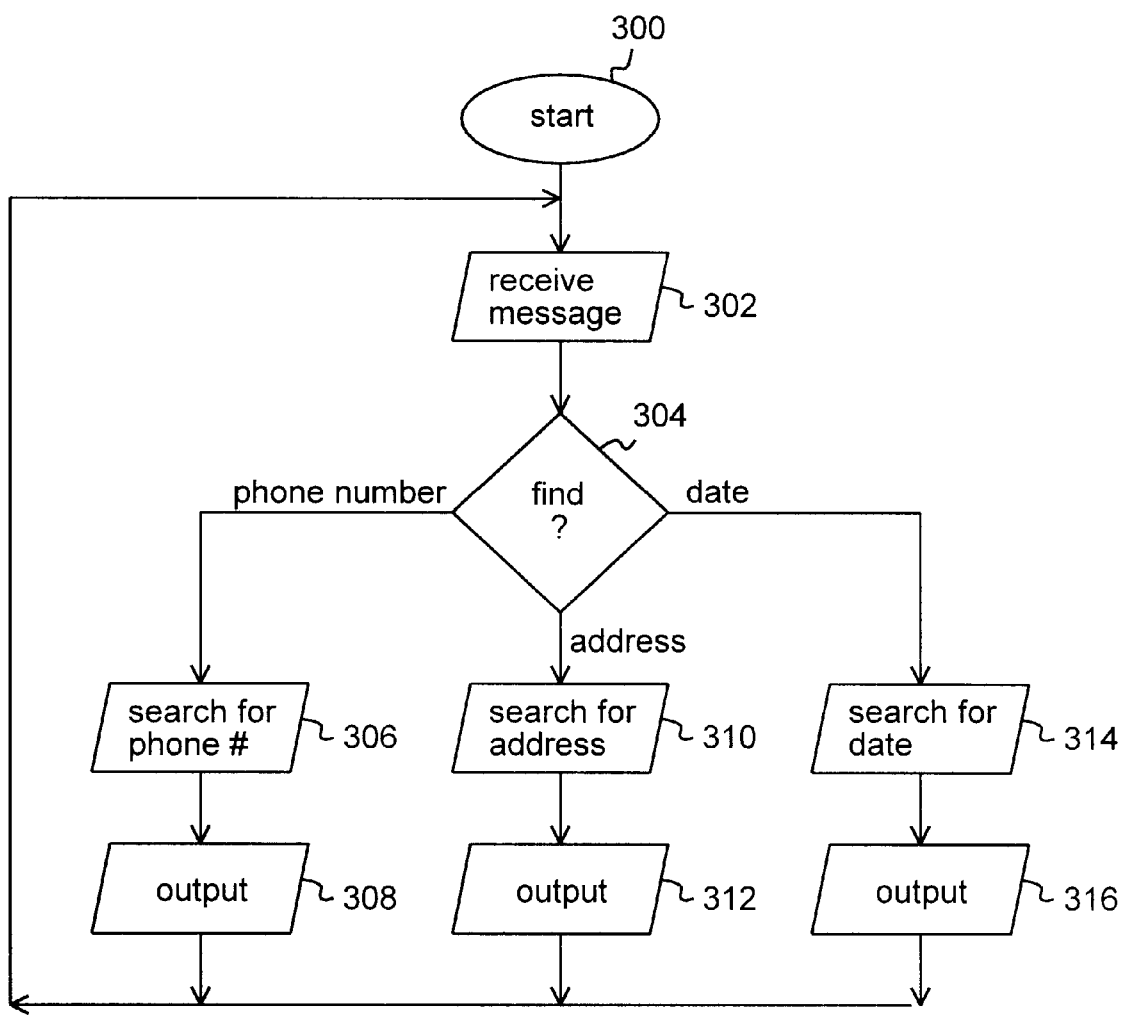
FIG. 3 illustrates a flow diagram for recognizing information selected by a recipient of a voice message in accordance with the present invention.

According to another aspect of the present invention, the grammar can be modified or selected by the recipient of the voice message so that the voice recognition system 100 searches for information of particular interest to the recipient. FIG. 3 illustrates a flow diagram for recognizing information selected by a recipient of a voice message in accordance with the present invention. The flow diagram of FIG. 3 illustrates graphically operation of the speech recognizing system 100 in accordance with the present invention. Program flow begins in a start state 300. From the state 300, program flow moves to a state 302. In the state 302, the voice recognition system 100 receives a voice message from the voice messaging system 150.

From the state 302, program flow moves to a state 304. In the state 304, the voice recognition system 100 awaits input from the recipient selecting a type of information the recipient is interested in obtaining from the voice message. In the preferred embodiment, the recipient plays the message back and then, based upon the content of the message, the recipient makes this selection. For example, the voice message may contain a phone number, an address, or a date that is of interest to the recipient.

Assuming the recipient selects a phone number in the state 304, program flow moves to a state 306. In the state 306, the voice recognition system 100 identifies potential speech utterances in the stored voice message and segments the voice message into a plurality of such utterances. Alternately, the voice recognition system 100 acts on the voice message as a whole. The voice recognition system 100 then searches the segments or the entire message for a predetermined numeric grammar which specifies a sequence of numbers occurring in the voice message, such as the caller's telephone number. Assuming the search performed in the state 306 was successful in locating the predetermined grammar, a portion of the voice message which includes the predetermined grammar is identified. Otherwise, program flow is aborted for corrective action.

Program flow then moves to a state 308. In the state 308, the voice recognition system 100 outputs a portion of the stored voice message which includes the grammar. The output can be a display of the caller's telephone number, a synthesized voice, DTMF tones, or the voice recognition system 100 can audibly replay the portion of the voice message which includes the caller's telephone number.

Assuming the recipient selects an address in the state 304, program flow moves to a state 310. In the state 310, the voice recognition system 100 identifies potential speech utterances in the stored voice message and segments the voice message into a plurality of such utterances. Alternately, the voice recognition system 100 acts on the voice message as a whole. The voice recognition system 100 then searches the segments or the entire message for a predetermined grammar which specifies an address occurring in the voice message. For example, the predetermined grammar can specify a street number and a street name. Assuming the search performed in the state 310 was successful in locating the predetermined grammar, a portion of the voice message which includes the predetermined grammar is identified. Otherwise, program flow is aborted for corrective action.

Program flow then moves to a state 312. In the state 312, the voice recognition system 100 outputs a portion of the stored voice message which includes the grammar. The output can be a display of the caller's address, a synthesized voice or the voice recognition system 100 can audibly replay the portion of the voice message which includes the caller's address.

Assuming the recipient selects a date in the state 304, program flow moves to a state 314. In the state 314, the voice recognition system 100 identifies potential speech utterances in the stored voice message and segments the voice message into a plurality of such utterances. Alternately, the voice recognition system 100 acts on the voice message as a whole. The voice recognition system 100 then searches the segments or the entire message for a predetermined grammar which specifies a date occurring in the voice message. For example, the predetermined grammar can specify a name of a month and a day of the month. Assuming the search performed in the state 314 was successful in locating the predetermined grammar, a portion of the voice message which includes the predetermined grammar is identified. Otherwise, program flow is aborted for corrective action.

Program flow then moves to a state 316. In the state 316, the voice recognition system 100 outputs a portion of the stored voice message which includes the grammar. The output can be a display of the date, a synthesized voice or the voice recognition system 100 can audibly replay the portion of the voice message which includes the date.

In an alternate embodiment, the recipient can select more that one type of information at a time. For example, the recipient could request a telephone number and an address in the state 304. In which case, the voice recognition system 100 searches for, identifies and outputs each selected type of information that can be found in the voice message.

In another alternate embodiment, the voice recognition system 100 can search for all of the specified types of information (e.g. phone numbers, addresses, and dates) while the recipient is listening to the voice message a first time, while the caller is leaving the message or after. The recipient makes a selection of which information is desired prior to, or after, listening to the message. Because the voice recognition search is completed before the recipient makes the selection, the selected information can be immediately provided to the recipient. Further, the voice recognition system 100 can volunteer specified types of information without being prompted.

Important information included in the stored message may be accompanied by an indicator that import information is to follow or that important information was just given. For example, the voice message may contain a telephone number. In which case, the caller is likely to have preceded the telephone number by saying, "you can reach me at", "my phone number is", "call me at", "my extension is", or the like. Accordingly, the indicator can be one of these phrases. As another example, the voice message may contain an address which is important. In which case, the caller is likely to have preceded a street number and street name by saying, "the address is", or followed a street number and street name by saying "street", "road", "avenue", "lane" or the like.

Accordingly, the indicator can be one of these phrases. It will be apparent that these indicators and exemplary only and the particular indicator utilized can be selected according to the type of information sought.

In accordance with the present invention, the predetermined grammar can specify an indicator of important information along with the important information. In which case, the voice recognition system searches the voice message for the indicator in conjunction with the important information. In such case, program flow proceeds as described in reference to FIG. 2.

Alternately, separate grammars are specified for the indicator and the important information. In which case, the voice recognition system 100 first searches the voice message for the predetermined indicator. Assuming a predetermined indicator is identified, the voice recognition system 100 then searches for the important information in the vicinity of the indicator. Use of the indicator of the important information is expected to increase the recognition accuracy of the invention.

Figure 4:
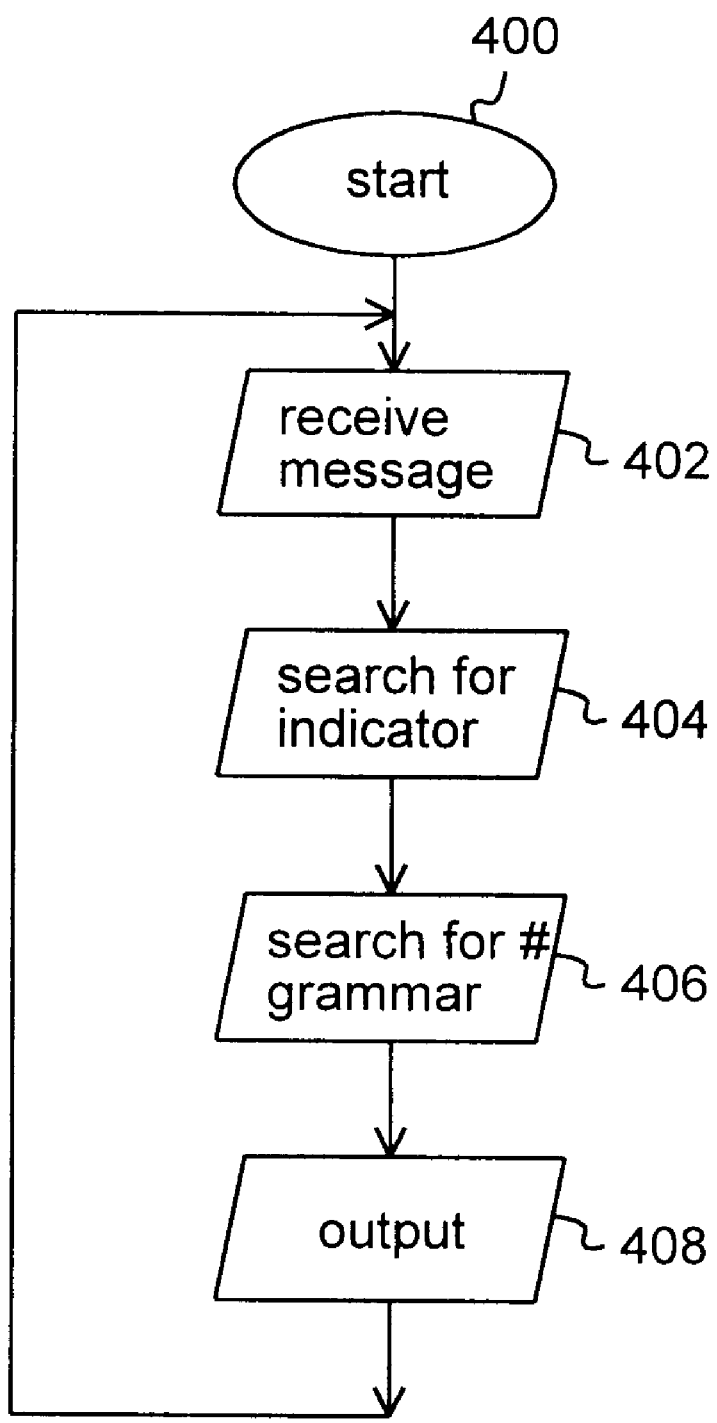
FIG. 4 illustrates a flow diagram for searching a voice message for a predetermined indicator in accordance with the present invention.

FIG. 4 illustrates a flow diagram for searching for a predetermined indicator in accordance with the present invention. The flow diagram of FIG. 4 illustrates graphically operation of the speech recognizing system 100 in accordance with the present invention. Program flow begins in a start state 400. From the state 400, program flow moves to a state 402. In the state 402, the voice recognition system 100 receives a voice message from the voice messaging system 150. The voice message can be received while the voice message is being recorded, upon playback of the message by the voice messaging system 150 or upon initiation by the intended recipient of the voice message. From the state 402, program flow moves to a state 404. In the state 404, the voice recognition system 100 searches for a predetermined indicator. Note that the voice recognition system can search for several different indicators in the state 404. For example, the voice recognition system 100 can simultaneously search for "my phone number is", "you can call me at" or the like. Assuming the predetermined indicator is found, program flow moves to a state 406. Otherwise, if the predetermined indicator is not found, program flow is aborted for corrective action. Corrective action can include repeating the search for the indicator, searching only for the important information or returning to the state 402 to await a next message.

In the state 406 the voice recognition system 100 searches for a predetermined grammar which specifies the important information in the vicinity of the indicator. In the preferred embodiment, the predetermined grammar is selected based upon the indicator. Thus, if the phrase "my phone number is" is located in the state 404, the voice recognition system searches for a numeric grammar which specifies a telephone number following the indicator. As another example, assuming the indicator is "road", then a grammar which preceded the indicator is expected to include a number and a street name, such as "1380 Willow". Assuming the predetermined grammar is located, the predetermined grammar is identified. Then program flow moves to a state 408.

In the state 408, a portion of the voice message which includes the grammar is outputted. For example, the telephone number, "555-1234" or the address "1380 Willow" can be displayed or audibly reproduced for the user. In addition, the indicator can be combined with the important information. Thus, the entire utterance, "my phone number is 555-1234", or "1380 Willow Road" can be provided to the recipient.

Assuming the grammar is not located in the state 406, corrective action can include outputting the indicator along with a predetermined length of the voice message which precedes or follows the indicator, as appropriate.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of recognizing information embedded in a stored voice message, wherein the method comprises steps of:
   a. providing the stored voice message to a speech recognizer;
   b. searching the stored voice message for all occurrences of a plurality of predetermined grammar types wherein each predetermined grammar type is one of a numeric grammar, an alpha grammar and an alphanumeric grammar, and further wherein each found occurrence corresponds to a predetermined grammar;
   c. identifying a portion of the stored voice message including the predetermined grammar; and
   d. outputting the portion of the stored voice message including each found predetermined grammar.

2. The method according to claim 1 wherein the step of outputting comprises a step of audibly replaying the portion of the stored voice message which includes the predetermined grammar.

3. The method according to claim 1 wherein the voice message is stored in a telephone voice mail system.

4. The method according to claim 3 wherein the step of searching is performed while the stored voice message is being recorded by a caller.

5. The method according to claim 1 wherein the predetermined grammar is selected by a recipient of the stored voice message.

6. The method according to claim 5 wherein the recipient of message selects the predetermined grammar after listening to the stored voice message.

7. The method according to claim 5 wherein the predetermined grammar is selected from a group consisting of: a telephone number grammar, an address grammar, a date grammar, a person's name grammar and a time of day grammar.

8. The method according to claim 1 further comprising a step of searching for at least one additional predetermined grammar.

9. A The method according to claim 8 wherein the predetermined grammar and the at least one additional predetermined grammar are each selected by the recipient of the message from a group consisting of: a telephone number grammar, an address grammar, a date grammar, and a time of day grammar.

10. A method of recognizing information embedded in a stored voice message, wherein the method comprises steps of:
    a. providing the stored voice message to a speech recognizer;
    b. searching the stored voice message for all occurrences of a plurality of predetermined grammar types wherein each predetermined grammar type is one of a numeric grammar, an alpha grammar and an alphanumeric grammar, and further wherein each found occurrence corresponds to a predetermined grammar;
    c. identifying information contained in the predetermined grammar; and
    d. outputting the information.

11. The method according to claim 10 wherein the step of outputting comprises steps of:
    a. identifying a number included in the portion of the voice message; and
    b. displaying the number.

12. The method according to claim 10 wherein the voice message is stored in a telephone voice mail system.

13. The method according to claim 12 wherein the step of searching is performed while the stored voice message is being recorded by a caller.

14. The method according to claim 10 wherein the predetermined grammar is selected by a recipient of the stored voice message.

15. The method according to claim 14 wherein the recipient of message selects the predetermined grammar after listening to the stored voice message.

16. The method according to claim 14 wherein the predetermined grammar is selected from a group consisting of: a telephone number grammar, an address grammar, a date grammar, and a time of day grammar.

17. The method according to claim 10 further comprising a step of searching for at least one additional predetermined grammar.

18. The method according to claim 17 wherein the predetermined grammar and the at least one additional predetermined grammar are each selected by the recipient of the message from a group consisting of: a telephone number grammar, an address grammar, a date grammar, and a time of day grammar.

19. A voice recognition system for recognizing information embedded in a stored voice message, wherein the voice recognition system comprises:
    a. an interface coupled to receive a voice message from a voice mail system;
    b. a voice recognizer coupled to the interface to search the stored voice message for all occurrences of a plurality of predetermined grammar types wherein each predetermined grammar type is one of a numeric grammar, an alpha grammar and an alphanumeric grammar, and further wherein each found occurrence corresponds to a predetermined grammar, and to identify the predetermined grammar within the voice message; and
    c. an output device coupled to the voice recognizer to provide a portion of the voice message which includes each found grammar to a user.

20. The voice recognition system according to claim 19 wherein the predetermined grammar is selected from a group consisting of: a telephone number grammar, an address grammar, a date grammar, and a time of day grammar.

21. The voice recognition system according to claim 19 wherein the predetermined grammar includes an indicator selected from the group consisting of: "telephone number is", "number is", "phone number is", "call me at", "reach me at" and "extension".

22. The voice recognition system according to claim 19 wherein the voice recognizer identifies at least one additional predetermined grammar.

23. A method or recognizing information embedded in a stored voice message, wherein the method comprises steps of:

(a) searching the stored voice message for a predetermined indicator which is a grammar;

(b) searching a portion of the stored voice message adjacent to the predetermined indicator for a predetermined grammar; and (c) recognizing the predetermined grammar.

24. The method according to claim 23 wherein the step of searching the stored voice message for the predetermined indicator comprises a step of searching the stored voice message for one or more additional predetermined indicators.

25. The method according to claim 24 wherein the predetermined grammar is selected according to which predetermined indicator is identified in the stored voice message.

26. The method according to claim 23 wherein the predetermined indicator is selected from the group of phrases consisting of: "telephone number is", "number is", "phone number is", "call me at", "reach me at" and "extension".

27. The method according to claim 23 wherein the stored voice message is stored in a telephone voice mail system.

28. The method according to claim 23 further comprising a step of outputting a portion of the telephone message including the predetermined grammar.

29. A method of recognizing information embedded in a stored voice message, wherein the method comprises steps of:

(a) segmenting the voice message into a plurality of segments;

(b) searching the plurality of segments for a predetermined indicator which is a grammar; and (c) identifying a predetermined grammar adjacent to the predetermined indicator.

30. The method according to claim 29 wherein the voice message is stored in a telephone voice mail system.

31. The method according to claim 30 further comprising a step of outputting a portion of the stored voice message which includes the identified grammar.

32. The method according to claim 29 further comprising a step of outputting a portion of the stored voice message which includes the identified grammar and the identified indicator.

33. A method of recognizing information embedded in a stored voice message, wherein the method comprises steps of:

(a) segmenting the voice message into a plurality of segments;

(b) searching the plurality of segments for a predetermined indicator which is a grammar: and (c) outputting a predetermined grammar adjacent to the predetermined indicator.

34. The method according to claim 33 wherein the stored voice message is stored in a telephone voice mail system.

35. The method according to claim 34 wherein the step of outputting comprises a step of audibly producing the predetermined length of the stored voice message.

36. The method according to claim 35 further comprising a step of outputting the predetermined indicator.

37. A method of recognizing information embedded in a stored voice message, wherein the method comprises steps of:

a. providing the stored voice message to a speech recognizer;

b. searching the stored voice message for a predetermined grammar wherein the predetermined grammar is one of a numeric grammar, an alpha grammar and an alphanumeric grammar;

c. identifying a portion of the stored voice message including the predetermined grammar; and d. outputting the portion of the stored voice message including the predetermined grammar and not outputting substantially all of a remaining portion of the stored voice message.

38. The method according to claim 37 wherein the step of outputting comprises a step of audibly replaying the portion of the stored voice message which includes the predetermined grammar.

39. The method according to claim 37 wherein the voice message is stored in a telephone voice mail system.

40. The method according to claim 39 wherein the step of searching is performed while the stored voice message is being recorded by a caller.

41. The method according to claim 37 wherein the predetermined grammar is selected by a recipient of the stored voice message.

42. The method according to claim 41 wherein the recipient of message selects the predetermined grammar after listening to the stored voice message.

43. The method according to claim 41 wherein the predetermined grammar is selected from a group consisting of: a telephone number grammar, an address grammar, a date grammar, a person's name grammar and a time of day grammar.

44. The method according to claim 37 further comprising a step of searching for at least one additional predetermined grammar.

45. The method according to claim 44 wherein the predetermined grammar and the at least one additional predetermined grammar are each selected by the recipient of the message from a group consisting of: a telephone number grammar, an address grammar, a date grammar, and a time of day grammar.

* * * * *

UNITED STATES PATENT AND TRADEMARK OFFICE
CERTIFICATE OF CORRECTION

PATENT NO. : 6,570,964 B1  Page 1 of 1
DATED : May 27, 2003
INVENTOR(S) : Murveit et al.

It is certified that error appears in the above-identified patent and that said Letters Patent is hereby corrected as shown below:

Item [56], References Cited, U.S. PATENT DOCUMENTS, add the following references to the U.S. Patent Documents cited:

-- US 6,219,407  04-2001  Kanevsky et al.  379/88.02
   US 6,208,713  03-2001  Rahrer et al.    379/67.1
   US 6,181,780  01-2000  Finnigan         379/67.1 --

Signed and Sealed this

Twenty-third Day of September, 2003

JAMES E. ROGAN
*Director of the United States Patent and Trademark Office*